United States Patent
Shirasaki

(10) Patent No.: US 8,840,111 B2
(45) Date of Patent: Sep. 23, 2014

(54) SHEET DELIVERING DEVICE

(71) Applicant: KYOCERA Document Solutions Inc., Osaka (JP)

(72) Inventor: Seiichi Shirasaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/072,482

(22) Filed: Nov. 5, 2013

(65) Prior Publication Data

US 2014/0131936 A1    May 15, 2014

(30) Foreign Application Priority Data

Nov. 15, 2012  (JP) ................................ 2012-250883

(51) Int. Cl.

| | | |
|---|---|---|
| *B65H 39/11* | (2006.01) | |
| *G03G 21/16* | (2006.01) | |
| *F16M 11/26* | (2006.01) | |
| *B65H 37/00* | (2006.01) | |
| *B65H 31/00* | (2006.01) | |
| *F16B 7/10* | (2006.01) | |
| *B65H 1/00* | (2006.01) | |

(52) U.S. Cl.
CPC .............. *B65H 1/00* (2013.01); *B65H 2402/10* (2013.01); *G03G 21/1619* (2013.01); *F16M 11/26* (2013.01); *B65H 37/00* (2013.01); *B65H 31/00* (2013.01); *B65H 2402/42* (2013.01); *B65H 2402/5151* (2013.01); *B65H 2801/27* (2013.01); *F16B 7/105* (2013.01); *B65H 2402/40* (2013.01); *B65H 2511/20* (2013.01); *B65H 39/11* (2013.01)
USPC ............................ 271/294; 271/292; 271/293

(58) Field of Classification Search
CPC ........................................................ B65H 39/11
USPC .......................................... 271/294, 292, 293
See application file for complete search history.

(56) References Cited

U.S. PATENT DOCUMENTS 8,240,681 B2    8/2012  Taguchi
8,500,123 B2 *  8/2013  Marcelis et al. .............. 271/294

FOREIGN PATENT DOCUMENTS

| JP | 2005-089170 A | 4/2005 |
| JP | 2008-001516 A | 1/2008 |
| JP | 2008-276270 A | 11/2008 |
| JP | 2009-217182 A | 9/2009 |

* cited by examiner

OTHER PUBLICATIONS

The extended European search report issued by the European Patent Office on Mar. 4, 2014, which corresponds to EP13189497.4—1705 and is related to U.S. Appl. No. 14/072,482.

*Primary Examiner* — Luis A Gonzalez
(74) *Attorney, Agent, or Firm* — Studebaker & Brackett PC

(57) ABSTRACT

A sheet delivering device includes a first frame stood on a base and a housing having a height position adjusted to the base. A second frame is attached to the housing in a body and located adjacent to the first frame. The height adjustment member is attached to one frame and includes engaged stop parts with different heights. The lever member is turnably attached to another frame and includes a contact stop member stopped into contact with the engaged stop part. Between an interference posture forming a contact stopping state by an interference of the contact stop member and engaged stop part and a withdrawal posture withdrawing from the interference when the housing moves to the base in the upward and downward directions, the lever member usually is advanced to the interference posture by a movement force, but changed to the withdrawal posture by turning against the movement force.

9 Claims, 16 Drawing Sheets

SHEET DELIVERING DEVICE

INCORPORATION BY REFERENCE

This application is based on and claims the benefit of priority from Japanese Patent application No. 2012-250883 filed on Nov. 15, 2012, the entire contents of which are incorporated herein by reference.

BACKGROUND

The present disclosure relates to a sheet delivering device receiving a sheet from an external device or transmitting the sheet to the external device.

There are various sheet delivering devices including a predetermined sheet processing device and a stack device in a housing to receive a sheet transmitted from an external device via a reception port arranged in the housing or to transmit the sheet to the external device via a transmission port arranged in the housing. In a field of an image forming apparatus, as the sheet delivering device, a post-processing apparatus may be illustrated, which is appended to an apparatus main body carrying out an image forming process to the sheet and carries out post process, such as punch process, staple process or fold process, to the sheet with a formed image.

The post-processing apparatus is usually an optional device and attached along a side face of the image forming apparatus. The post-processing apparatus includes a housing configured to house post-processing devices, receives the sheet ejected from a sheet ejection port of the image forming apparatus via a sheet reception port arranged in the housing and carries out predetermined post-processes to the sheet. Therefore, the post-processing apparatus needs to be appended to the image forming apparatus in a situation aligning the sheet ejection port and reception port. Generally, one post-processing apparatus is often set as the optional device for a plurality of the image forming apparatuses having different machine types and grades. Height positions of the sheet ejection ports may be different for each image forming apparatus. In such a case, it is necessary to move the position of the sheet reception port of the post-processing apparatus in upward or downward directions.

For example, a manner adjusting the height position of the sheet reception port by arranging a height adjustment base in a low part of the post-processing apparatus is disclosure. However, in this manner, it is necessary to prepare the height adjustment bases for every image forming apparatuses having different height positions of the sheet ejection ports, and therefore, there is a problem complicating installation work. In addition, a post-processing apparatus moving the sheet reception port in the upward and downward directions by an elevating mechanism is disclosure. In this apparatus, because the height position of the sheet reception port can be adjusted freely, the sheet reception port may be deviated from a desired position by misoperation or unintended movement of the elevating mechanism. As a result, there is a problem causing a sheet jam or a misfeed delivering the sheet to unregulated position. Moreover, an apparatus adjusting a height position of a main body of the post-processing apparatus is suggested by turning a bearing of a wheel shaft of a caster supporting the main body of the post-processing apparatus. However, in this apparatus, although it is suitable to finely adjust the height position in accordance with a state of an installation floor face, there is a problem that the machine types having different height positions of the sheet ejection ports cannot be coped with.

SUMMARY

In accordance with an embodiment of the present disclosure, a sheet delivering device includes a base, a first frame, a housing, a second frame, a height adjustment member, a lever member and an auxiliary member. The first frame is stood on the base and extends in upward and downward directions. The housing includes a sheet distribution opening as an inlet and an outlet of a sheet and has a height position adjusted to the base. The second frame is attached to the housing in a body, extends in the upward and downward directions and is located adjacent to the first frame. The height adjustment member is attached to one of the first frame and second frame and includes a plurality of engaged stop parts arranged at different height positions. The lever member is turnably attached to another of the first frame and second frame and includes a contact stop member stopped into contact with the engaged stop part of the height adjustment member. A posture of the lever member is changed between an interference posture forming a contact stopping state by interfering the contact stop member with the engaged stop part and a withdrawal posture making the contact stop member withdrawn from the engaged stop part without interfering the contact stop member with the engaged stop part when the housing moves to the base in the upward and downward directions. The lever member usually is advanced to the interference posture by a movement force in a first turning direction. The posture of the lever member is changed from the interference posture to the withdrawal posture by a turn of the lever member in a second turning direction opposite to the first turning direction against the movement force. The auxiliary member gives the lever member the movement force toward the first turning direction.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
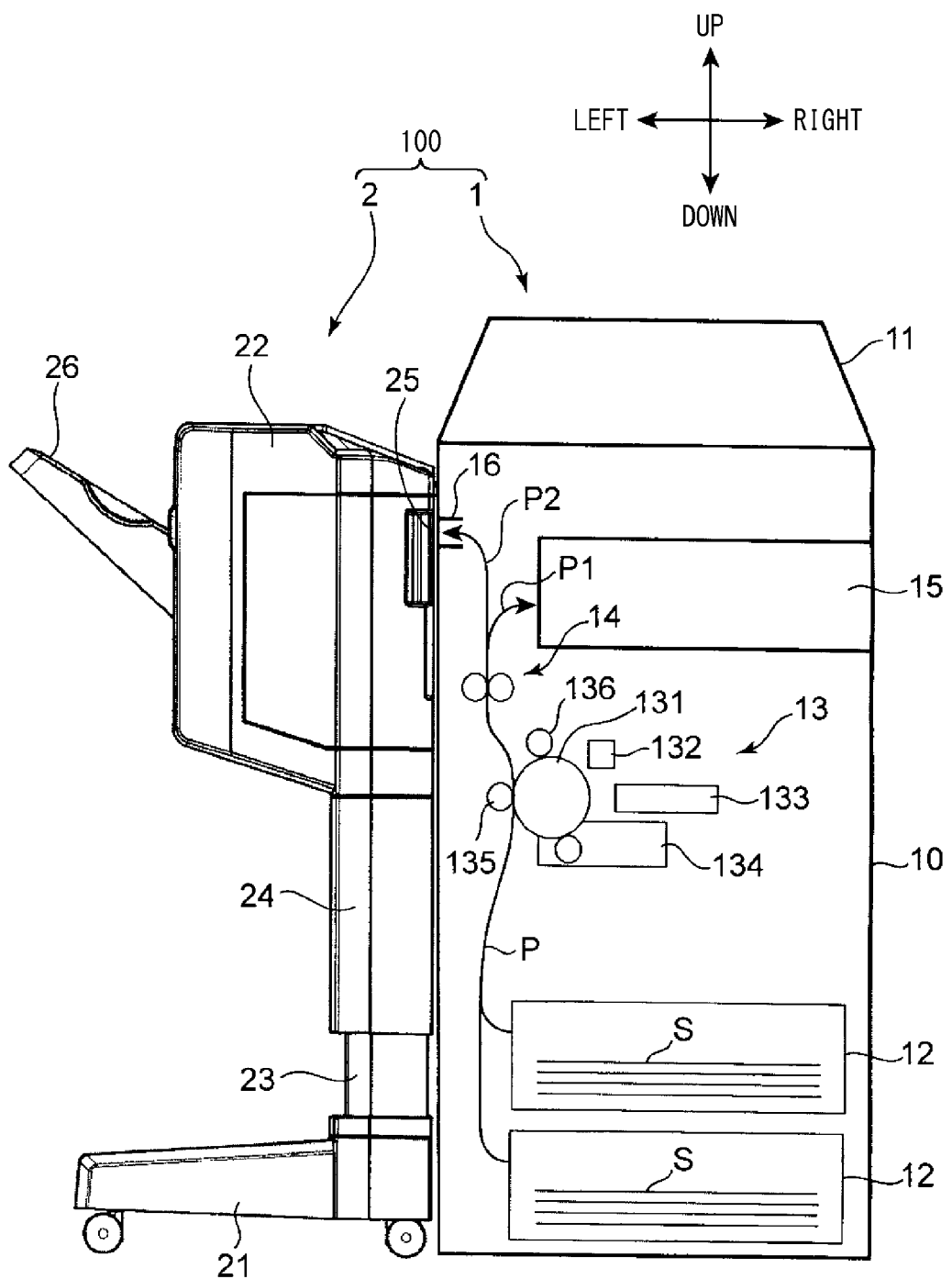
FIG. 1 is a front view schematically showing an image forming system including a post-processing apparatus according to an embodiment of the present disclosure.

In the following, an embodiment of the present disclosure will be described in detail with reference to the drawings. FIG. 1 is a front view schematically showing an external appearance of an image forming system 100 including a post-processing apparatus according to an embodiment of the present disclosure. The image forming system 100 includes an image forming apparatus 1 carrying out image forming process to a sheet and a post-processing apparatus 2 appended along a left side face of this image forming apparatus 1. FIG. 1 schematically shows an internal structure about the image forming apparatus 1 and an external appearance about the post-processing apparatus 2.

As the image forming apparatus 1, FIG. 1 shows an in-body sheet ejecting type monochrome copying machine. The image forming apparatus 1 may be a color copying machine, a printer, a facsimile device or a multifunction peripheral having these functions. The image forming apparatus 1 includes a main body housing 10 and an automatic document feeding device (ADF) 11 located on an upper part of the main body housing 10. In the main body housing 10, a sheet feeding parts 12, an image forming part 13 and a fixing part 14 are located in order from downward, a sheet conveying path P extending in upward and downward directions is arranged near the left side face. Near the upper part of the main body housing 10, an in-body sheet ejection part 15 is arranged and, in the left side face, a sheet ejection port 16 is arranged.

The sheet feeding parts 12 store a plurality of sheets S to which the image forming process is performed. FIG. 1 shows an example of arranging upper and lower sheet feeding parts 12 in two stages. The sheet S stored in the sheet feeding part 12 is fed to the sheet conveying path P by a feeding roller (not shown). The sheet conveying path P extends from the sheet feeding part 12 as a start point via the image forming part 13 and fixing part 14 to the upper part of the main body housing 10 in the vertical direction and is configured to convey the sheet S by a convey roller (not shown). The sheet conveying path P diverges at a downstream side of the fixing part 14 to a first ejected sheet conveying path P1 toward the in-body sheet ejection part 15 and a second ejected sheet conveying path P2 toward the sheet ejection port 16.

The image forming part 13 generates a toner image and transfers this onto the sheet S. The image forming part 13 includes a photosensitive drum 131 and a charger 132, an exposure device 133, a development device 134, a transfer roller 135 and a cleaning device 136 located around the photosensitive drum 131.

On a circumference face of the photosensitive drum 131, an electrostatic latent image and the toner image are formed. As the photosensitive drum 131, a photosensitive drum made of an amorphous silicon-series (a-Si) material may be applied. The charger 132 uniformly electric-charges a circumference of the photosensitive drum 131. The exposure device 133 includes a laser light source and optical instruments, such as a mirror and lens, and irradiates the circumference of the photosensitive drum 131 with a light based on image data of the document image to form the electrostatic latent image. The development device 134 supplies a toner (a developer) to the circumference of the photosensitive drum 131 in order to develop the electrostatic latent image. To the development device 134, the toner is replenished from a toner container (not shown). The transfer roller 135 forms a transfer nip part with the photosensitive drum 131 and receives transfer bias. To the sheet S passing through the transfer nip part, the toner image on the photosensitive drum 131 is transferred. The cleaning device 136 includes a cleaning roller and cleans the circumference of the photosensitive drum 131 after the toner image is transferred.

The fixing part 14 fixes the toner image transferred to the sheet S. The fixing part 14 includes a heating roller incorporated with a heat generating body and a pressing roller pressed to the heating roller. When the sheet with the transferred toner image passes through a fixing nip part formed by the heating roller and pressing roller, the toner is heated and melted and the toner image is fixed to the sheet. The sheet S after a fixing process is ejected via the first ejected sheet conveying path P1 to the in-body sheet ejection part 15 or fed via the second ejected sheet conveying path P2 and sheet ejection port 16 to the post-processing apparatus 2.

The ADF 11 automatically feeds a document sheet to be copied to a predetermined document reading position. Although illustration in the figures is omitted, in the upper part of the main body housing 10, a contact glass for reading the manual-placed document sheet and another contact glass for automatically reading are installed, and then, the ADF 11 conveys the document sheet via the latter position. Just below these contact glasses, an image reading unit (not shown) optically reading an image of the document sheet is located.

The post-processing apparatus (a sheet delivering device) 2 carries out predetermined post-processes to the sheet or a sheaf of sheets to which the image forming process is performed in the image forming apparatus 1. The post-processes has, for example, punch process boring a binding hole in the sheet, staple process providing a staple to a group of the sheets by striking, fold process folding the sheet, alignment process carrying out shift operation and width aligning operation described below in detail to the sheet and others. The post-processing apparatus 2 includes a base 21, a housing 22, base leg parts 23, housing leg parts 24, a sheet reception port (a sheet distribution opening) 25 and an ejection tray 26

Broadly describing, the base 21 is a support base of the housing 22 and the housing 22 houses various components and members for the post-processes. To the base leg parts 23 standing upward on the base 21, the housing leg parts 24 extending downward from the housing 22 are fitted, and then, a height position of the housing 22 can be determined by varying both engaging position. The sheet reception port 25 is an opening introducing the sheet in the housing 22 and its height position needs to be aligned with the sheet ejection port 16 of the image forming apparatus 1. The adjustment of the height position of the sheet reception port 25 can be actualized by determining the height position of the housing 22. Therefore, the post-processing apparatus 2 can be applied as an optional device to various image forming apparatuses having different height positions of the sheet ejection ports 16. In the following, a configuration of such a post-processing apparatus 2 will be described in detail.

Figure 2:
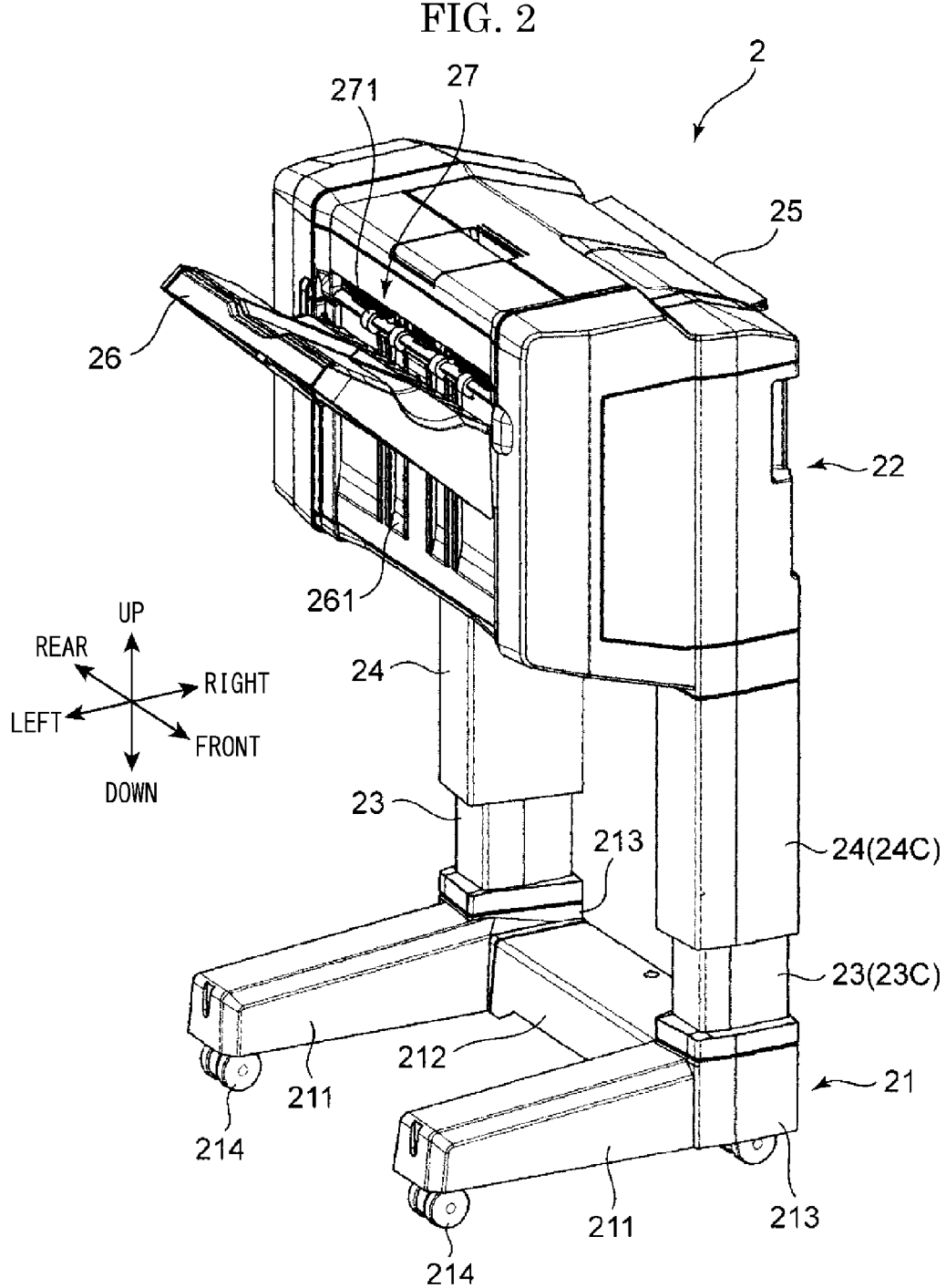
FIG. 2 is a left top perspective view schematically showing the post-processing apparatus according to the embodiment of the present disclosure.
Figure 3:
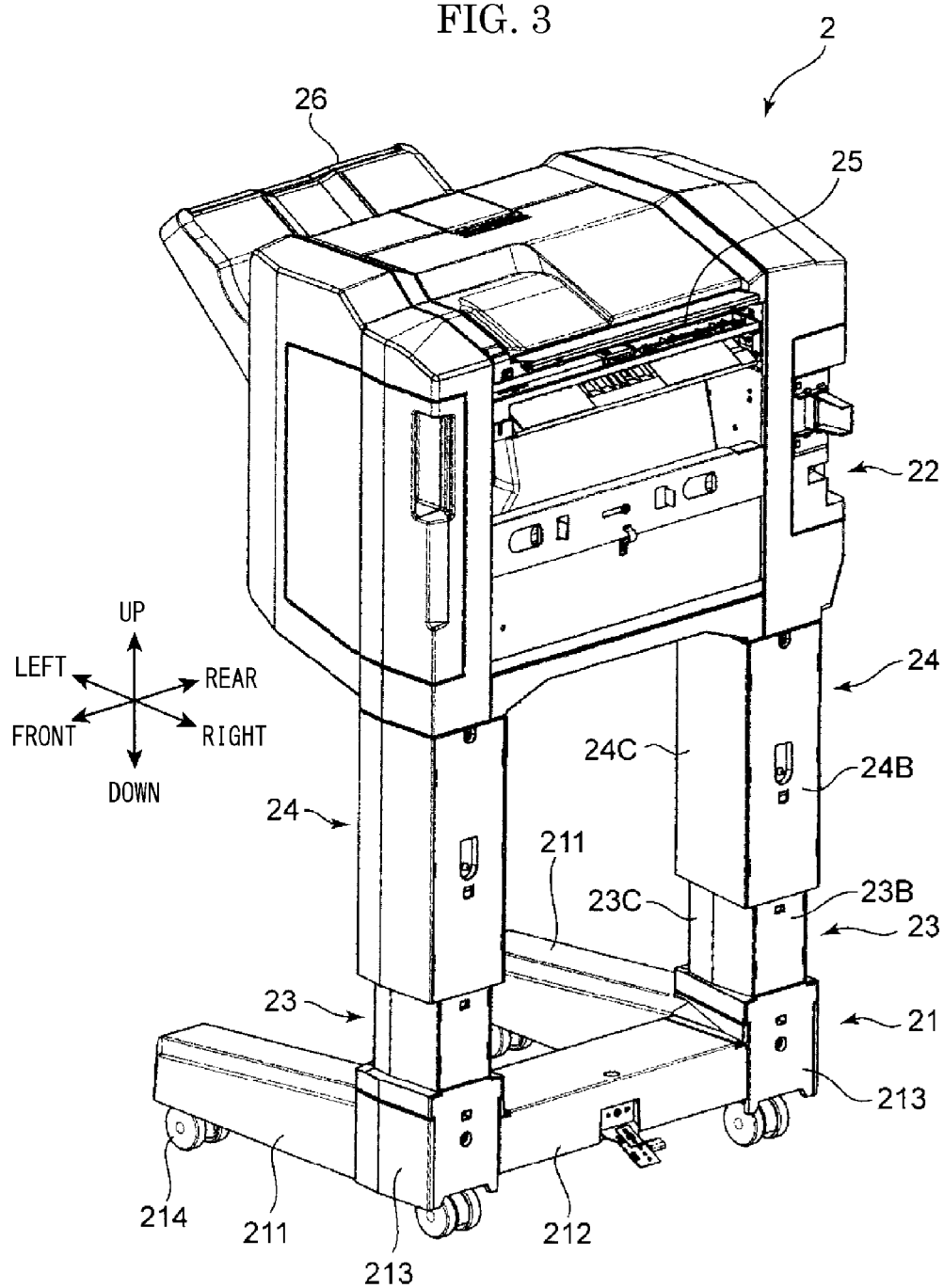
FIG. 3 is a right top perspective view schematically showing the post-processing apparatus according to the embodiment of the present disclosure.

FIG. 2 is a left top perspective view of the post-processing apparatus 2 and FIG. 3 is a right top perspective view of the post-processing apparatus 2. The base 21 includes two chassis 211 extending in left and right directions and arranged in parallel, and a connecting beam 212 connecting right ends of these chassis 211 and extending in forward and backward directions. In right end parts of the respective chassis 211, foundation parts 213 are arranged as a base part on which the base leg part 23 is stood. The connecting beam 212 connects these foundation parts 213. To a lower face of each chassis 211, casters 214 are attached near left end and right end. Thus, the base 21 is provided with a car body structure formed in a U-shape in a top plan view and having four casters 214 on the lower face.

The housing 22 is a housing elongated in the forward and backward directions. The housing 22 includes the sheet reception port 25 in its right side face and a sheet ejection port 27 in its left side face. The sheet reception port 25 is configured to receive the sheet ejected from the sheet ejection port 16 of the image forming apparatus 1 into the inside of the housing 22 and the sheet ejection port 27 is configured to eject post-processed sheet from the inside of the housing 22. The housing 22 houses a post-processing unit consisting of a punching tooth and its driving mechanism for the above-mentioned punch process, a stapler for the above-mentioned staple process, an aligning mechanism for aligning sheet width, a sheet conveying path, a sheet conveying roller and others. The height position of the housing 22 to the base 21 is adjusted by adjusting an engaging position of the base leg part 23 and housing leg part 24.

The ejection tray 26 is located in a left end face of the housing 22 and in a lower part of the sheet ejection port 27. In the sheet ejection port 27, a sheet ejecting roller 271 is located, and then, the sheet ejecting roller 271 is driven so that the post-processed sheet is ejected from the inside of the housing 22 to the ejection tray 26. The ejection tray 26 is configured to move in the upward and downward direction along a guide part 261 arranged in the left end part of the housing 22.

A pair of the base leg parts 23 are members unified with the base 21, are vertically stood from the foundation parts 213, and are square pillar-liked legs having a predetermined size in the upward and downward directions. A pair of the housing leg parts 24 are members unified with the housing 22, vertically suspended from a left lower face of the housing 22, and are square pillar-liked legs having a predetermined size in the upward and downward directions. The housing leg part 24 has an opening allowing to insert a top end of the base leg part 23 in its lower end and an inside space being housable the entire base leg part 23.

By fitting the housing leg parts 24 to the base leg parts 23 from above, the housing 22 is installed to the base 21. The base leg part 23 is immovable, but the housing leg part 24 is slidingly-movable in the upward and downward directions along the base leg part 23, and accordingly, the housing 22 is movable in the upward and downward directions. In situations shown in FIGS. 2 and 3, the housing leg parts 24 (and the housing 22) have been slid to an upper side by a predetermined length than a lowermost position, thereby exposing a part of the base leg parts 23. If the housing leg parts 24 are descended to the lowermost position, the base leg parts 23 are entirely stored in the housing leg parts 24. Therefore, when the post-processing apparatus 2 according to the embodiment is packed and transported, by setting the post-processing apparatus 2 in the above-mentioned descent state to the lowermost position, it is possible to reduce packing size and to contribute for saving of packing member and reduction of transport cost.

Figure 4:
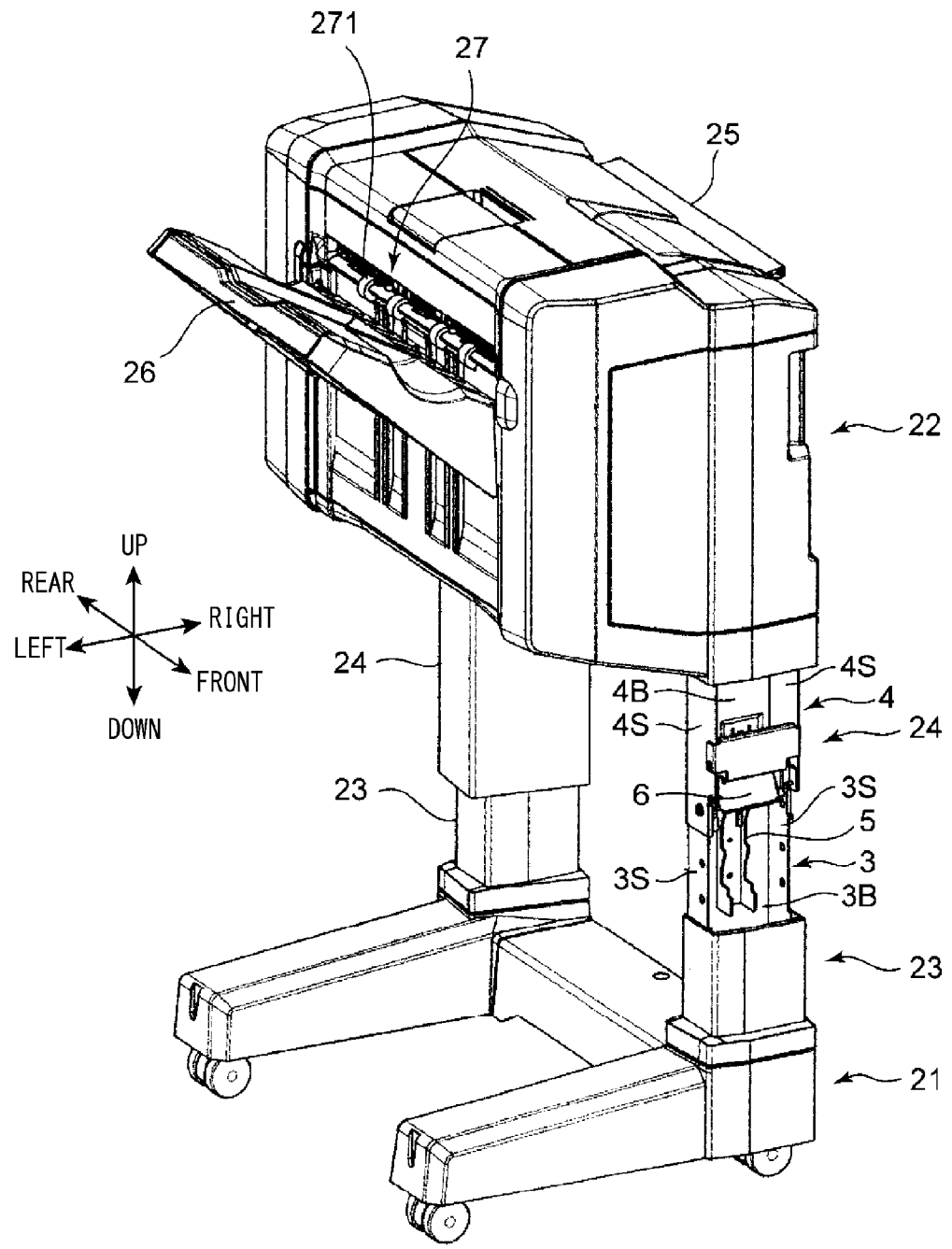
FIG. 4 is a perspective view schematically showing the post-processing apparatus, in a state that a covering member of a housing leg part is detached, according to the embodiment of the present disclosure.

FIG. 4 is a perspective view of the post-processing apparatus 2 in a state that the inside of the housing leg part 24 is exposed. As shown in FIG. 3, an exterior of the base leg part 23 is composed of a plane board-liked back face board 23B located in a right side face of the post-processing apparatus 2 and a cover member 23C with a U-shaped cross section covering the back face board 23B from a left side. Similarly, an exterior of the hosing leg part 24 is composed of a plane board-liked back face board 24B located in the above-mentioned right side face and a cover member 24C with a U-shaped cross section covering the back face board 24B from a left side. FIG. 4 shows a situation that the back face board 24B and cover member 24C are detached.

The base leg part 23 includes a first frame 3 extending in the upward and downward directions. The first frame 3 is stood from the base 21 so that its lower end is fixed to a frame forming the chassis 211 and its upper end vertically extends upward. A shape of the first frame 3 has a U-shaped cross section composed of a plane bottom board 3B extending in the upward and downward directions and a pair of side boards 3S stood from left and right sides of this bottom board 3B.

The housing leg part 24 includes a second frame 4 extending in the upward and downward directions. The second frame 4 is suspended from the housing 22 so that its upper end is attached to a flame forming an exterior of the housing 22 in a body and its lower end vertically extends downward. A shape of the second frame 4 has, similarly to the first frame 3, a U-shaped cross section composed of a plane bottom board 4B extending in the upward and downward directions and a pair of side boards 4S stood from left and right sides of this bottom board 4B. An interval between the pair of side boards 4S is slightly longer than an interval between the pair of side boards 3S. The first frame 3 and second frame 4 are assembled so as to slidingly-move relatively in a situation, in which the bottom board 4B of the second frame 4 is adjacent to the bottom board 3B of the second frame 3 and each side board 3S of the first frame 3 is adjacent to the inside of the each side board 4S of the second frame 4.

To the first frame 3, a height adjustment member 5 having a plurality of engaged stop parts located at different height positions is attached. To the second frame 4, a lever member 6 having a contact stop member stopped into contact with the engaged stop part of the height adjustment member 5 is turnably attached. Depending on which height position of the engaged stop part of the height adjustment member 5 the contact stop member of the lever member 6 is stopped into contact with, the height position of the housing 22 (the sheet reception port 25) is determined. In the following, detail structures of the height adjustment member 5 and lever member 6 will be described.

Figure 5:
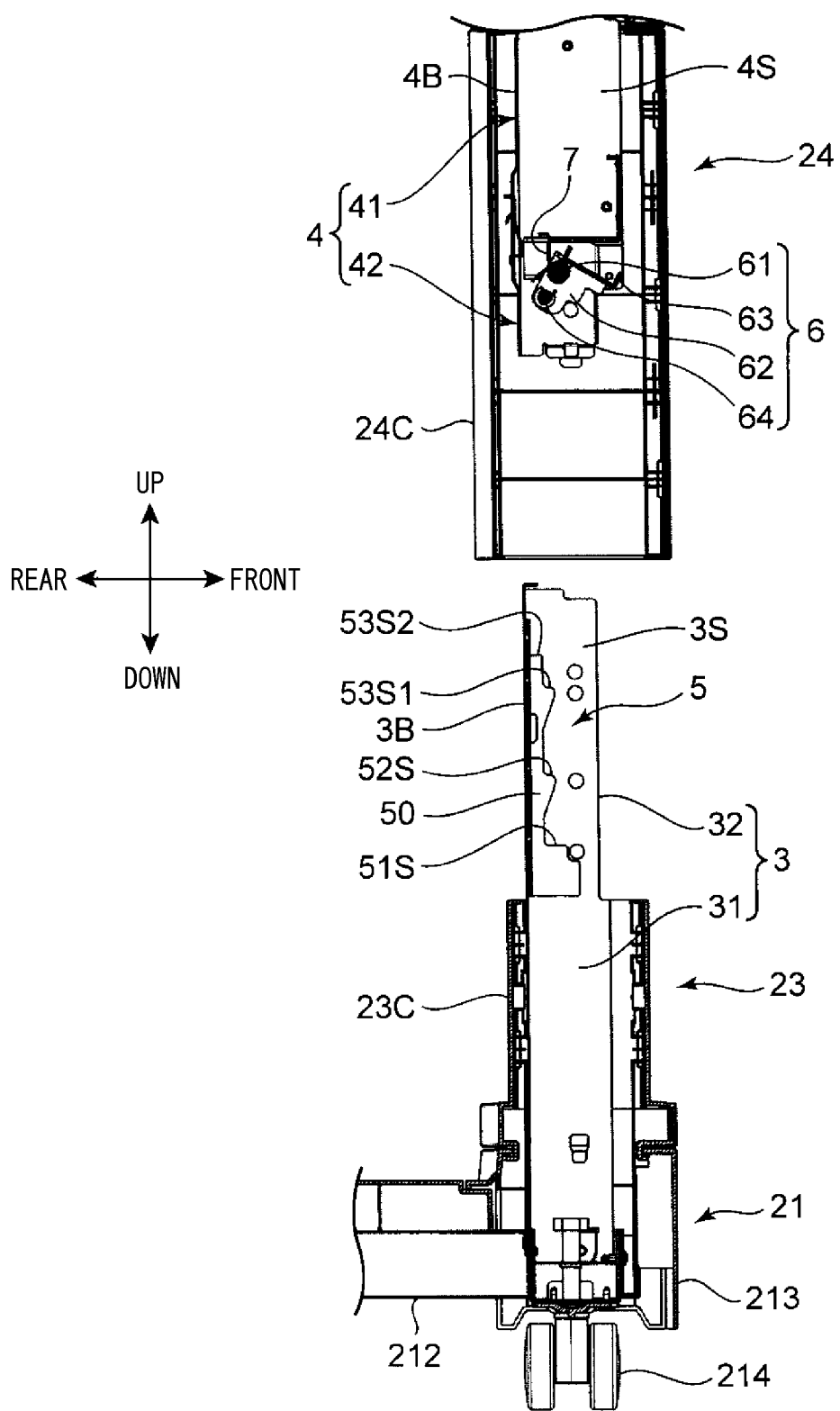
FIG. 5 is a side sectional view schematically showing a first frame and a second frame before assembling according to the embodiment of the present disclosure.
Figure 6:
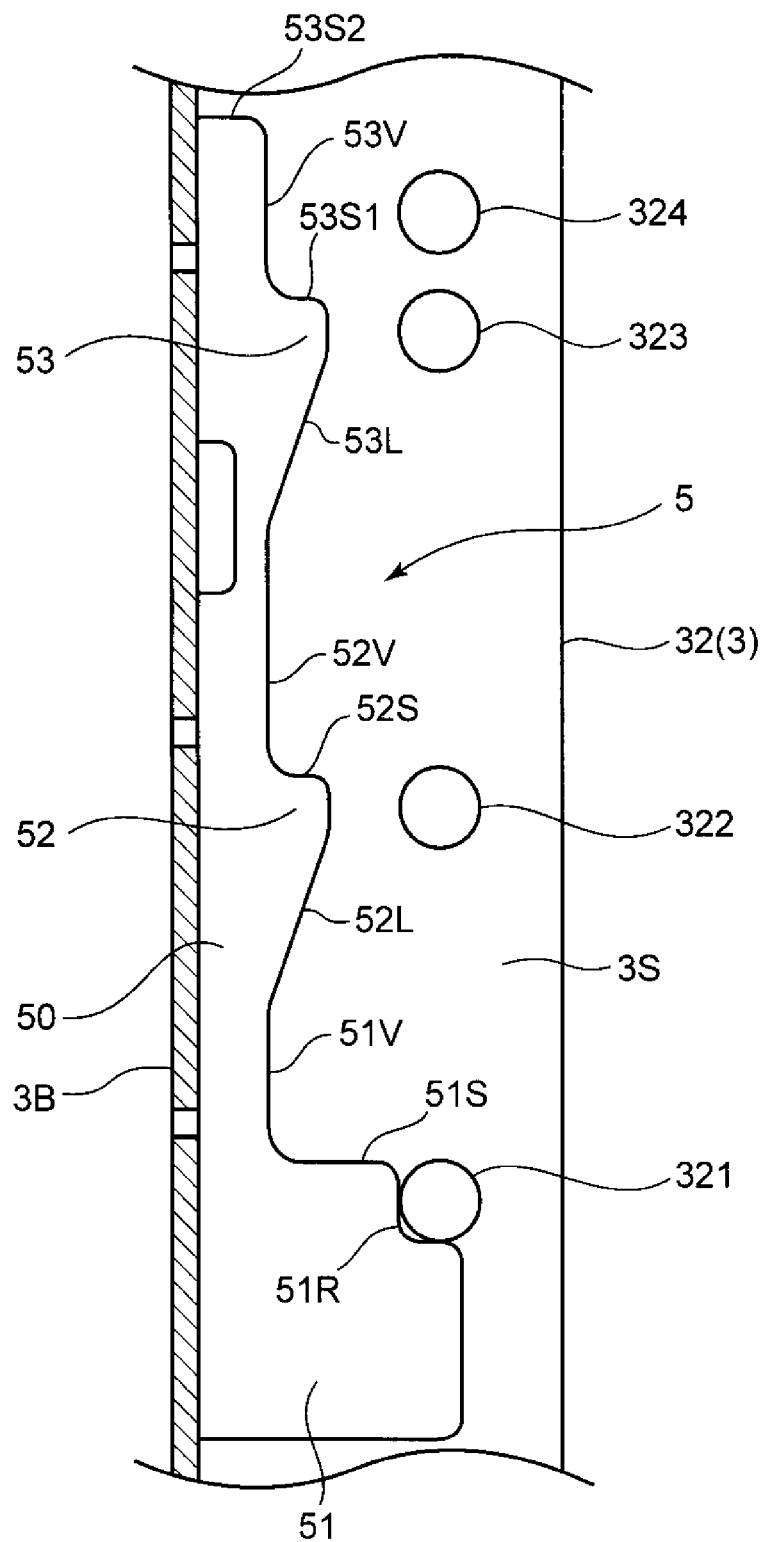
FIG. 6 is an enlarged view schematically showing a height adjustment member shown in FIG. 5.
Figure 7:
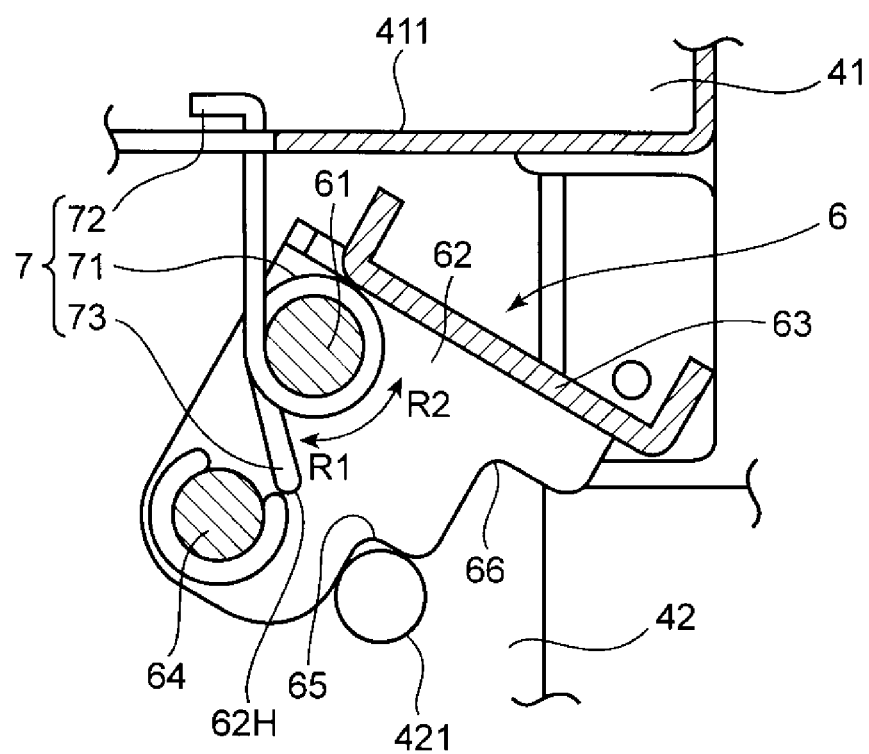
FIG. 7 is an enlarged view schematically showing a lever member shown in FIG. 5.

FIG. 5 is a side sectional view showing the first frame 3 and second frame 4 before assembling. FIG. 6 is an enlarged view showing the height adjustment member 5 and FIG. 7 is an enlarged view showing the lever member 6. The first frame 3 includes a first base part 31 housed in the cover member 23C of the base leg part 23 and a first projection part 32 projected upward from the cover member 23C. A lower end part of the first base part 31 is fixed to a frame in the foundation parts 213. In a pair of side boards 3S of the first projection part 32, four pin holes (first, second, third and fourth pin holes 321, 322, 323 and 324) arranged in a line in the upward and downward directions are bored. These pin holes are holes in which below-mentioned pin member 8 (refer to FIGS. 8 and 11 and others) is inserted.

The frame 4 includes a second base part 41 and a second projection part 42 projected downward from a lower end of second base part 41. An upper end part of the second base part 41 is fixed to a frame in the housing 22. In the second projection part 42, one pin hole (a fifth pin hole 421) in which the pin member 8 is inserted is bored.

The height adjustment member 5 is attached to the first projection part 32 of the first frame 3. The height adjustment member 5 includes a pair of restriction boards 50 with the same shape becoming a state of being stood from the bottom board 3B in a situation of the height adjustment member 5 being attached to the first projection part 32. The restriction board 50 is a board-liked member elongated in the upward and downward directions and arranged in parallel to the side board 3S.

The restriction board 50 includes a first engaged stop projection 51, second engaged stop projection 52 and third engaged stop projection 53 (engaged stop parts) arranged at intervals in the upward and downward directions and projected sideways. The first engaged stop projection 51 is a rectangular projection projected at a lower position of the restriction board 50 and has a horizontal upper edge being as a first support upper face 51S. The second engaged stop projection 52 is a trapezoid projection projected at an intermediate position of the restriction board 50 in the upward and downward directions and has an upper edge being as a second support upper face 52S. The third engaged stop projection 53 is a trapezoid projection projected at an upper position of the restriction board 50 and has an upper edge being as a third support upper face 53S1.

Above the first, second and third support upper faces 51S, 52S and 53S1, vertical first, second and third contact faces 51V, 52V and 53V are arranged, respectively. Standing heights of these first, second and third contact faces 51V, 52V and 53V from the bottom board 3B are equal to each other. In other words, the first, second and third contact faces 51V, 52V and 53V are in respective shifted positions in the upward and downward directions, but essentially in same position in a horizontal direction. On the other hand, in an uppermost edge of the restriction board 50, a sub support upper face 53S2 is arranged at a position shifted from other support upper faces not only in the upward and downward directions, but also in the horizontal direction. The sub support upper face 53S2 is located near the third support upper face 53S1 of third engaged stop projection 53 at a considerable shorter interval (almost half) than intervals between other support upper faces in the upward and downward directions. The first, second, third and fourth pin holes 321, 322, 323 and 324 bored in the first projection part 32 of the first frame 3 are arranged so as to correspond to the first, second and third support upper faces 51S, 52S and 53S1 and the sub support upper face 53S2, respectively.

The first, second and third support upper faces 51S, 52S and 53S1 and the sub support upper face 53S2 are arranged so as to correspond to the respective height positions of the sheet ejection ports 16 of the various image forming apparatuses 1 to which the post-processing apparatus is external-attached as optional device. By applying the height adjustment member 5 according to the embodiment, it is possible to correspond to four height positions and to apply the post-processing apparatus to the image forming apparatus 1.

The lever member 6 is attached to the second projection part 42 of the second frame 2. The lever member 6 includes an axis member 61, holding members 62, a manipulated part 63, a supported bar 64 (a contact stop member/a supported member), a first reception part 65 and a second reception part 66.

The axis member 61 is a bar-liked member being as an axis (a turn supporting point) for turning the lever member 6 and has both ends held by the pair of the side boards 4S of the second frame 4. The holding member 62 has a through hole in which the axis member 61 is inserted and is a member turnable around the axis of the axis member 61. That is, as shown in FIG. 7, the holding member 62 is turned in a first turning direction R1 along a clockwise direction and a second turning direction R2 along a counterclockwise direction. The holding members 62 are arranged as a pair at left and right sides and respectively located in parallel to and close to the pair of the side boards 4S.

The manipulated part 63 is a rectangular board-liked member elongated in the left and right directions and connects the pair of the left and right holding members 62 in a body. In actuality, both ends of one rectangular metal plate are bent so as to stand vertically, and then, its center part acts as the manipulated part 63 and the bent parts of the both ends act as the holding members 62. Therefore, when external force is applied to the manipulated part 63, the holding member 62 is turned around the axis of the axis member 61. A user manipulates this manipulated part 63 by his/her fingers when manipulating in order to turn the lever member 6. A direction that the user turns the lever member 6 is almost the second turning direction R2.

The supported bar 64 is a bar-liked member elongated in the left and right directions, and is held by the pair of the holding members 62 and stopped into contact with (supported by) either of the support upper faces 51S, 52S and 53S1 and the sub support upper face 53S2. The axis member 61 penetrates near a proximal end part of the bend of the holding part 62 (at a position close to the board member being as the manipulated part 63) and the supported bar 64 is held neat a top end far from the proximal end part.

Figure 8:
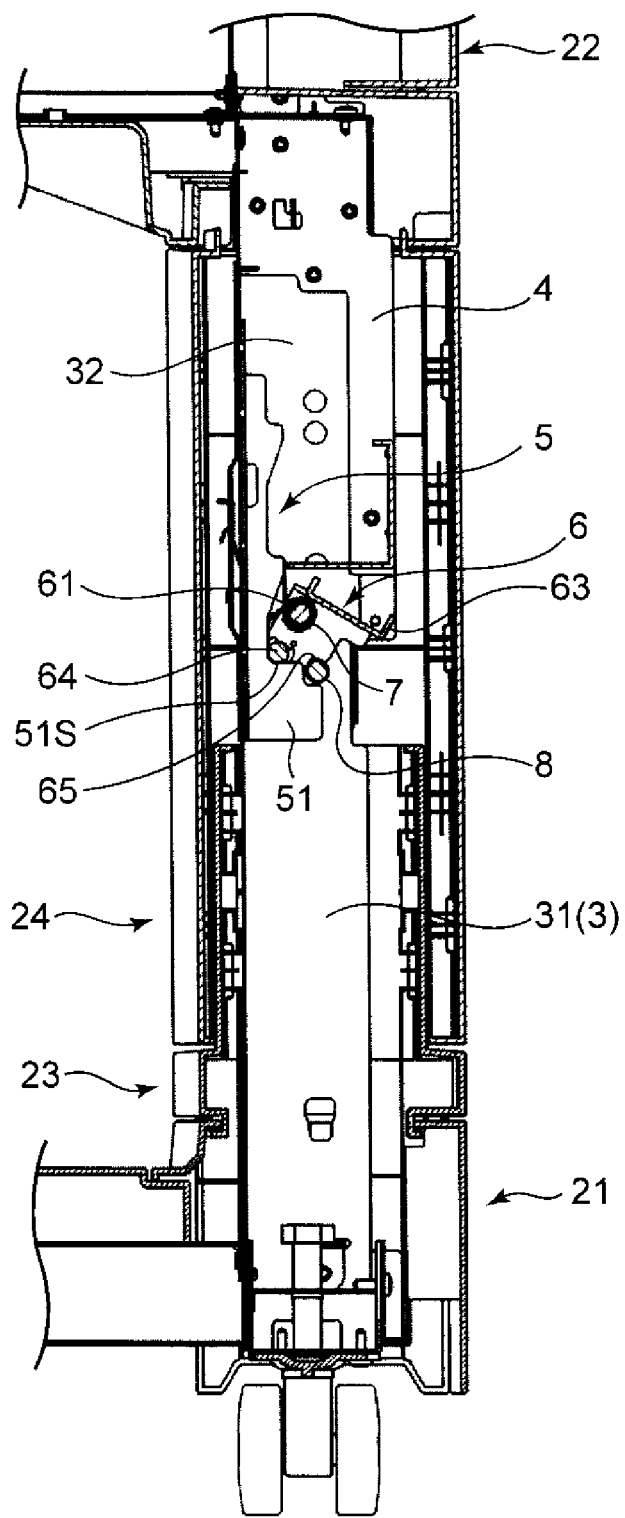
FIG. 8 is a side view schematically showing an engaging situation of the first frame and second frame, in a case where a sheet reception port of a housing is positioned at a lowest position, according to the embodiment of the present disclosure.
Figure 11:
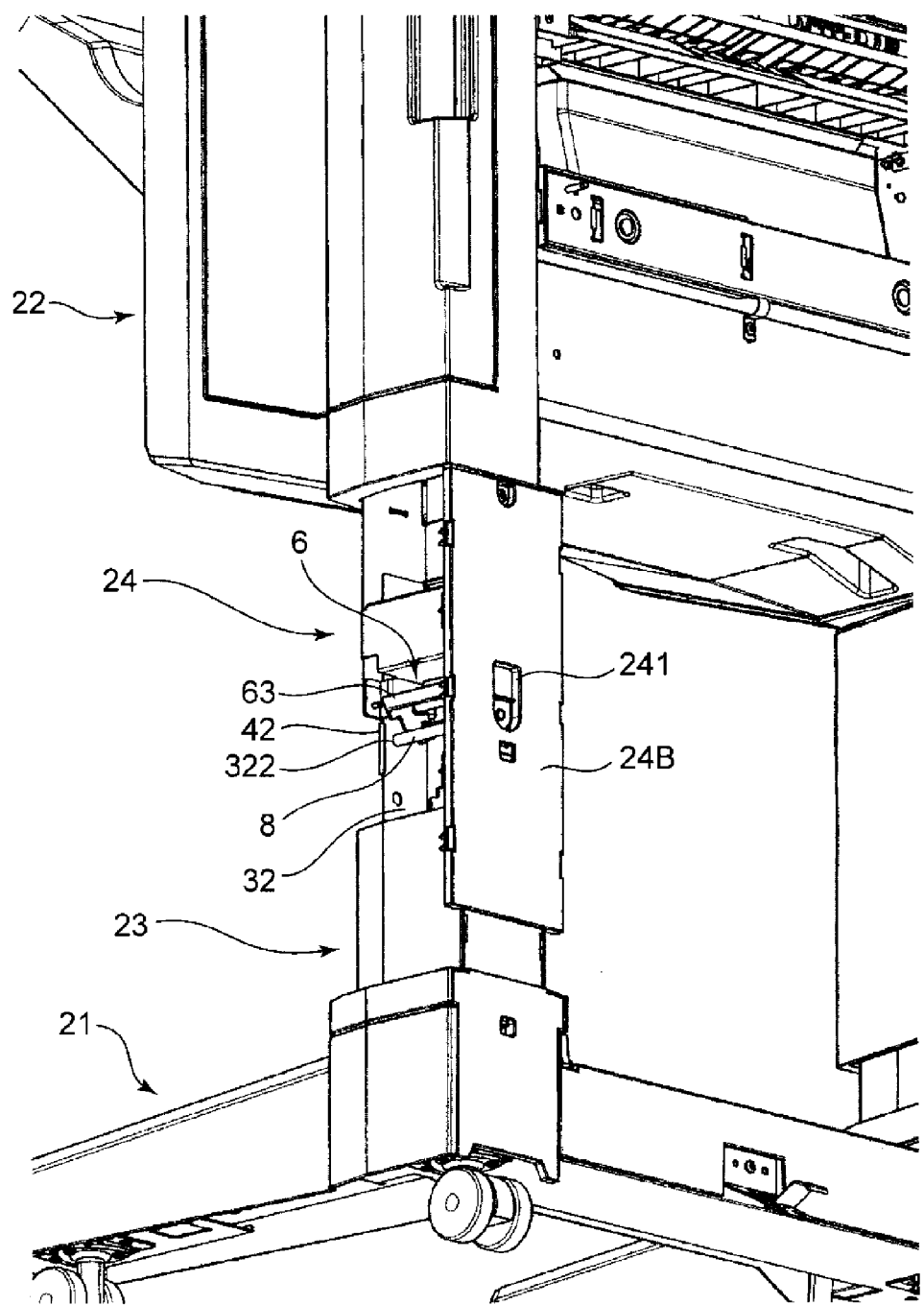
FIG. 11 is a perspective view used for explaining insertion of a pin member according to the embodiment of the present disclosure.
Figure 14:
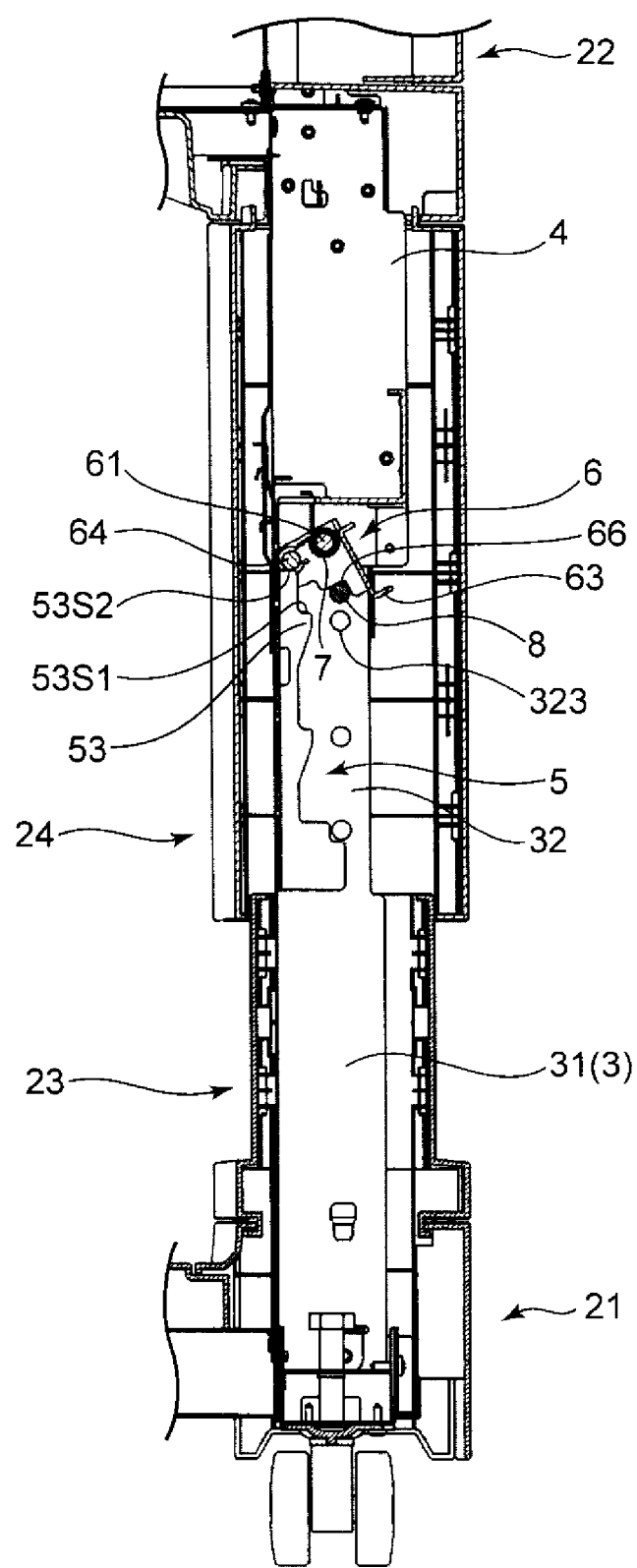
FIG. 14 is a side view schematically showing an engaging situation of the first frame and second frame, in a case where the sheet reception port of the housing is positioned at an uppermost position by further turning the lever member from the situation of FIG. 13, according to the embodiment of the present disclosure.

The first reception part 65 and second reception part 66 are roughly triangular depressed part, and are formed in a rim of the holding member 62 and supported by the pin member 8 (refer to FIGS. 8, 11, 14 and others). The pin member 8 is inserted in the fifth pin hole 421. In a view of a circumference direction around the axis member 61, the first reception part 65 is positioned at a downstream side in the first turning direction R1 by a predetermined angle from the second reception part 66. The first reception part 65 and second reception part 66 are arranged so as to align with a position of the fifth pin hole 421 in a view of an axis direction of the axis member 61. That is, when the holding member 62 (the lever member 6) is turned in the first turning direction R1 by a predetermined angle from a state of the manipulated part 63 being horizontal, the depression of the first reception part 65 and fifth pin hole 421 are overlapped, and then, as shown in FIG. 7, the fifth pin hole 421 is entirely exposed in the view of the axis direction of the axis member 61. When the holding member 62 is further turned in the first turning direction R1 by a predetermined angle from such a state, the depression of the second reception part 66 and fifth pin hole 421 are overlapped, and then, the fifth pin hole 421 is entirely exposed in the view of the axis direction of the axis member 61 again.

To the lever member 6, a twist coil spring (an auxiliary member) 7 is annexed, and then, the lever member 6 is usually biased so as to turn in the first turning direction R1. As shown in FIG. 7, a coil part 71 of the twist coil spring 7 is fitted to the axis member 61, one end 72 of the coil part 71 is stopped in an engaged state with a lower edge frame 411 of the second base part 41 of the second frame 4 and another end 73 of the coil part 71 is inserted in a spring holding hole 62H arranged in the holding member 62. A state of the lever member 6 shown in FIG. 7 is a state of being biased in the first turning direction R1 by bias force of the twist coil spring 7.

When the housing leg parts 24 are fitted to the base leg parts 23 from above, positional relationship of the axis member 61 of the lever member 6 and the second engaged stop projection 52 and third engaged stop projection 53 of the height adjustment member 5 is determined so as to not interfere with each other. On the other hand, the supported bar 64 interferes with the second engaged stop projection 52 and third engaged stop projection 53 in a situation in which the lever member 6 is turned in the first turning direction R1 as shown in FIG. 7. By contrast, if the lever member 6 is turned in the second turning direction R2 from a situation shown in FIG. 7 and the supported bar 64 is positioned just below the axis member 61, the supported bar 64 does not interfere with the second engaged stop projection 52 and third engaged stop projection 53. The first engaged stop projection 51 has a sideways projecting degree larger than other engaged stop projections, that is, has positional relationship interfering with the axis member 61 and supported bar 64.

Due to the above-mentioned relationship of a turn state and a position, in a situation in which the lever member 6 is turned in the first turning direction R1 by the predetermined angle, the supported bar 64 is put in a state that it can be supported by either of the first, second and third support upper faces 51S, 52S and 53S1 and the sub support upper face 53S2. On the other hand, in another situation in which the lever member 6 is turned in the second turning direction R2 by the predetermined angle, the lever member 6 does not interfere with the height adjustment member 5 except for the first engaged stop projection 51 and the second frame 4 is put in a state that it can be freely slide-moved to the first frame 3 in the upward and downward directions.

Therefore, because the lever member 6 is arranged in a side of the second frame 4 unified with the housing 22, the user can easily height adjustment operation manipulating the lever member 6 and moving the housing 22 in the upward and downward directions.

That is, a posture of the lever member 6 can be switched between an interference posture and a withdrawal posture. In the interference posture, the supported bar 64 is supported by (interfered with) either (engaged stop part) of the first, second and third support upper faces 51S, 52S and 53S1 and the sub support upper face 53S2 to form a state of being stopped into contact with the height adjustment member 5. In the withdrawal posture, the supported bar 64 is withdrawn so as to not interfere with the second and third support upper faces 52S and 53S1 and the sub support upper face 53S2 when the housing 22 is moved to the base 21 in the upward and downward directions. The lever member 6 is biased by the bias force of the twist coil spring 7 so as to usually advance to the interference posture. If the user manipulates the manipulated part 63 to turn the lever member 6 in the second turning direction R2 against the bias force, the posture of the lever member 6 can be switched from the interference posture to the withdrawal posture.

Next, with reference to FIGS. 8-14, the adjustment operation of the height position of the housing 22 (the sheet reception port 25) will be described. FIG. 8 is a side view showing an engaging situation of the first frame 3 (the height adjustment member 5) and second frame 4 (the lever member 6), in a case where the sheet reception port 25 of a housing 22 is positioned at a lowest position.

The lever member 6 is kept in the interference posture by the bias force of the twist coil spring 7. The supported bar 64 of the lever member 6 is supported on the first support upper face 51S of the first engaged stop projection 51 positioned below the height adjustment member 5 (the restriction board 50). The first reception part 65 of the lever member 6 is supported by the pin member 8 (a fixing member) and fixed so that the lever member 6 is not turned in the second turning direction R2. This pin member 8 is a member preventing the lever member 6 in the interference posture from unintentionally becoming the withdrawal posture by a vibration caused in a case where the user moves the post-processing apparatus 2 or the like. The pin member 8 is intended to stop slip-off by using a locking member (not shown), such as a retaining ring. According to the embodiment, because the lever member 6 is supported not only by the bias force of the twist coil spring 7, but also by the pin member 8, the height position of the housing 22 can be put in an immovable state after the height position is adjusted.

Further referring to FIG. 6 and moreover describing in detail, the supported bar 64 is supported on the first support upper face 51S and stopped into contact with the first contact face 51V by the bias force of the twist coil spring 7. That is, the supported bar 64 is put in a pressed state to the vertical first contact face 51V by the bias force and is fitted to a corner, where the horizontal first support upper face 51S and vertical contact face first 51V intersect, by a load applied from the housing 22. The load of the housing 22 is received by the first support upper face 51S. The pin member 8 is inserted in the first pin hole 321 of the first frame 3 (the first projection part 32) and the fifth pin hole 421 of the second frame 4 (the second projection part 42). Thus, because the pin member 8 penetrates both the first frame 3 and second frame 4, the pin member 8 also receives the load of the housing 22. A notch 51R formed in the first engaged stop projection 51 is a notch avoiding disturbance of the insertion of the pin member 8 in the first pin hole 321.

Figure 9:
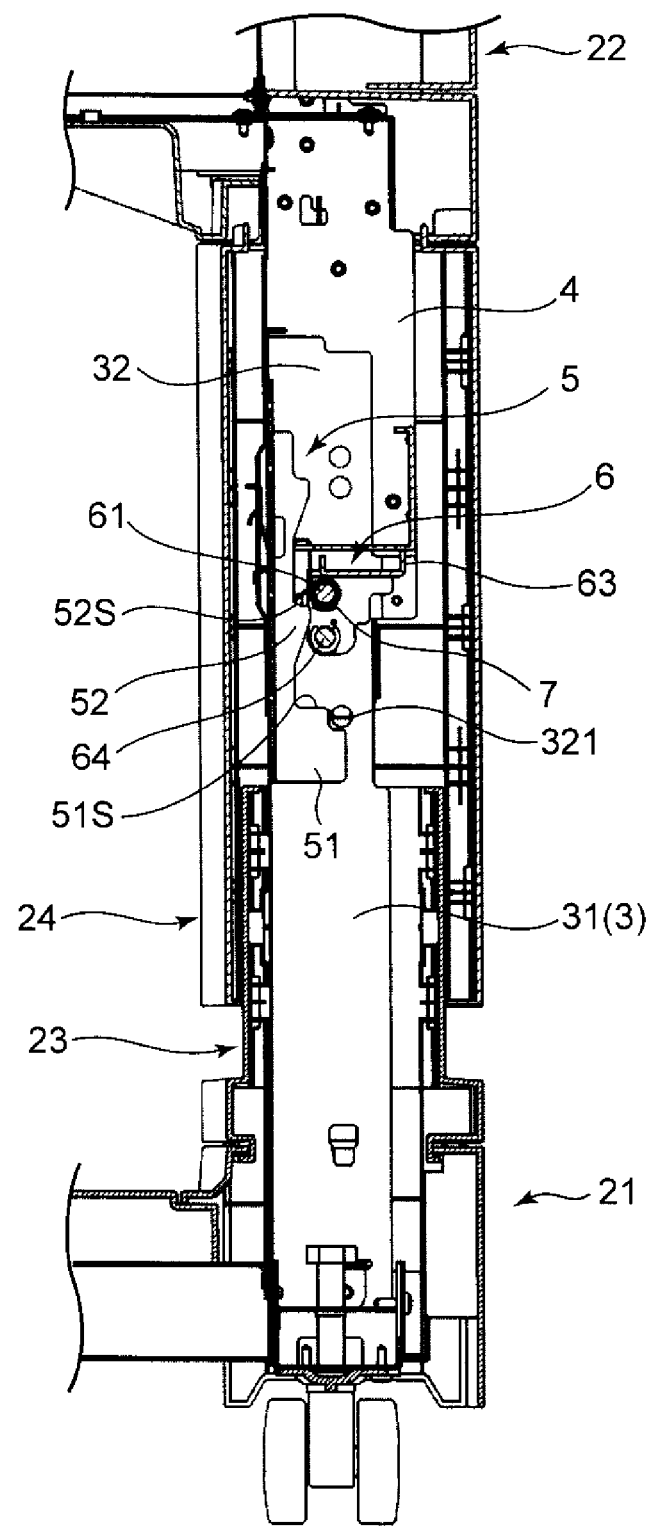
FIG. 9 is a side view schematically showing an engaging situation of the first frame and second frame, in a case where the sheet reception port of the housing is ascended from the lowermost position to an intermediate position, according to the embodiment of the present disclosure.

FIGS. 9-12 shows a procedure for shifting the sheet reception part 25 from the lowest position shown in FIG. 8 to the intermediate position (a position of the second support upper face 52S). FIG. 9 is a side view showing relationship of the first frame 3 and second frame 4 ascended from the lowermost position to the intermediate position. In a work of this ascent, the user firstly removes the cover member 24C of the housing leg member 24. Subsequently, the user removes the pin member 8 from the first pin hole 321 and fifth pin hole 421 to release a locked state of the lever member 6 and to turn the lever member 6 in the second turning direction R2 by hooking the finger on the manipulated part 63, thereby putting the lever member 6 in the withdrawal posture.

While keeping this withdrawal posture, the user lifts the housing 22 to ascend it to the intermediate position. FIG. 9 shows a situation after such an ascent. Because the lever member 6 is put in the withdrawal posture, the supported bar 64 does not interfere with the second engaged stop projection 52 and a work of the lift is not disturbed. In addition, because an inclined part 52L (FIG. 6) is formed between the second engaged stop projection 52 and first contact face 51V and the lever member 6 guided by the inclined part is automatically turned in the second turning direction R2, the user can smoothly carry out the work of the lift without being compelled to actively put the lever member 6 in the withdrawal posture.

Figure 10:
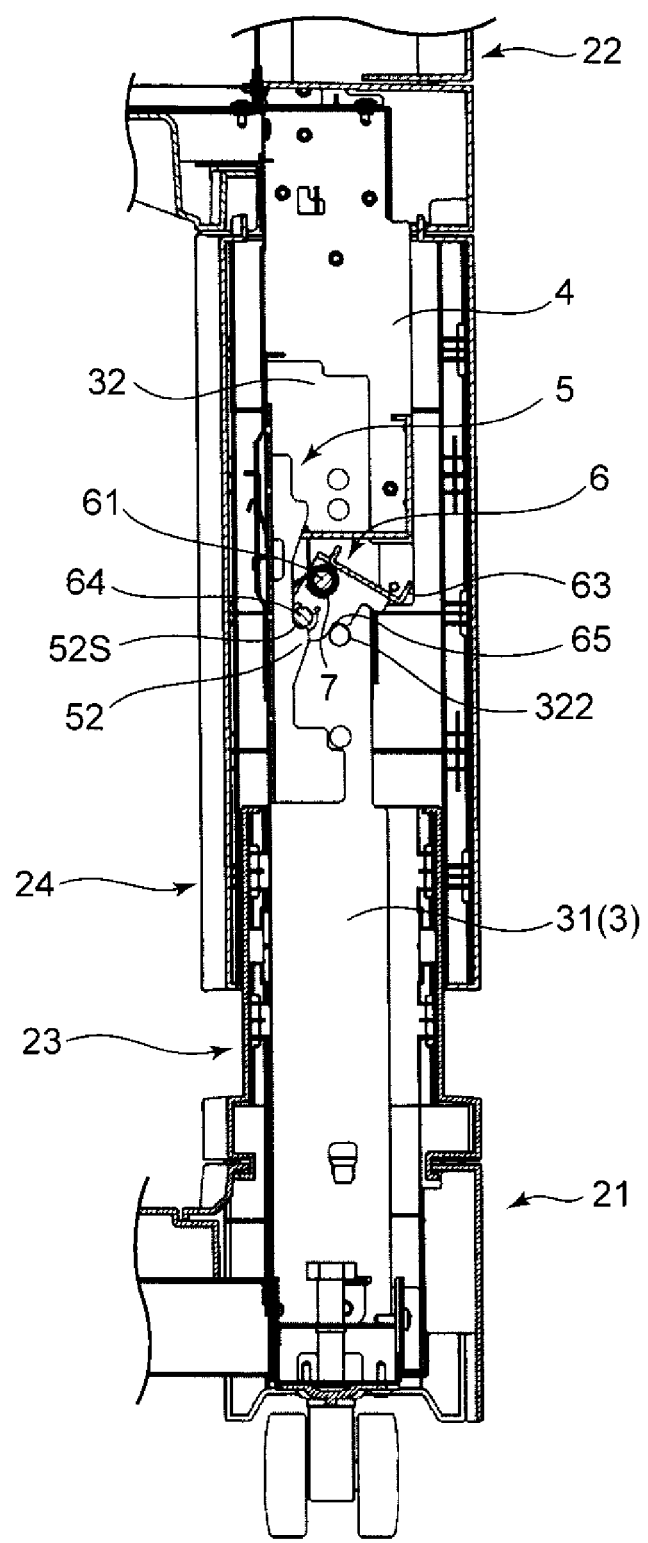
FIG. 10 is a side view schematically showing an engaging situation of the first frame and second frame, in a case where the sheet reception port of the housing is positioned at the intermediate position, according to the embodiment of the present disclosure.

FIG. 10 shows a situation in which, by releasing user's hold on the manipulated part 63 from the situation of FIG. 9, the lever member 6 is turned in the first turning direction R1 by the bias force of the twist coil spring 7 to be put in the interference posture. In such a case, the supported bar 64 is supported by the second support upper face 52S and stopped into contact with the second contact face 52V by the bias force. By the turn in the first turning direction R1, the second pin hole 322 and depression of the first reception part 65 are put in an aligned state and the second pin hole 322 is exposed in a side view.

Subsequently, the user inserts the pin member 8 to fix the lever member 6. FIG. 11 is a perspective view used for explaining the insertion of the pin member 8. In the back face board 24B of the housing leg part 24, an opening 241 for the insertion of the pin member 8 is formed. By utilizing this opening 241, the user inserts the pin member 8 in the second pin hole 322 of the first frame 3 (the first projection part 32) and fifth pin hole 421 of the second frame 4 (the second projection part 42).

Figure 12:
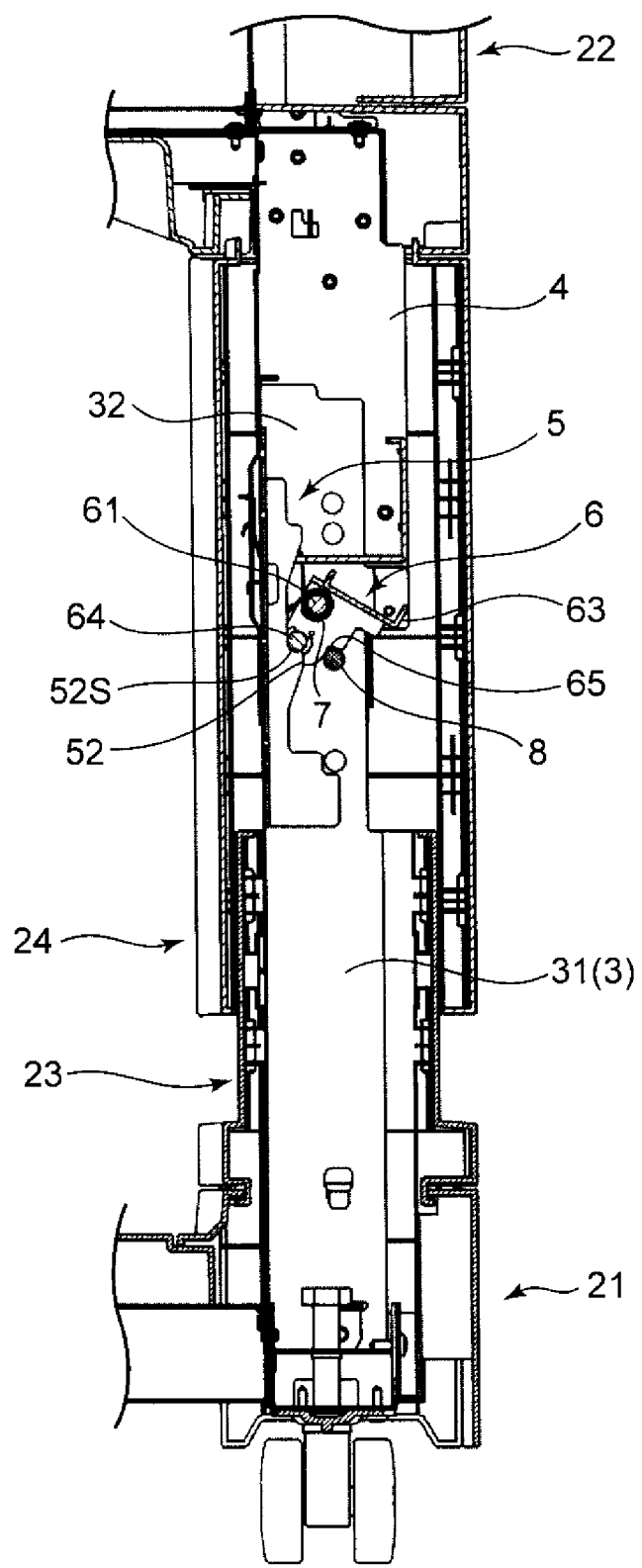
FIG. 12 is a side view (in a situation of the pin member having been already inserted) schematically showing an engaging situation of the first frame and second frame, in the case where the sheet reception port of the housing is positioned at the intermediate position, according to the embodiment of the present disclosure.

FIG. 12 is a side view showing an engaging situation of the first frame 3 and second frame 4 in a case where the sheet reception port 25 of the housing 22 is positioned at the intermediate position and shows a situation of the pin member 8 having been already inserted. Similarly to a case of FIG. 8, the first reception 65 of the lever member 6 is supported by the pin member 8. According to this, the lever member 6 is put in the locked state and the turn in the second turning direction R2 is restricted.

Figure 13:
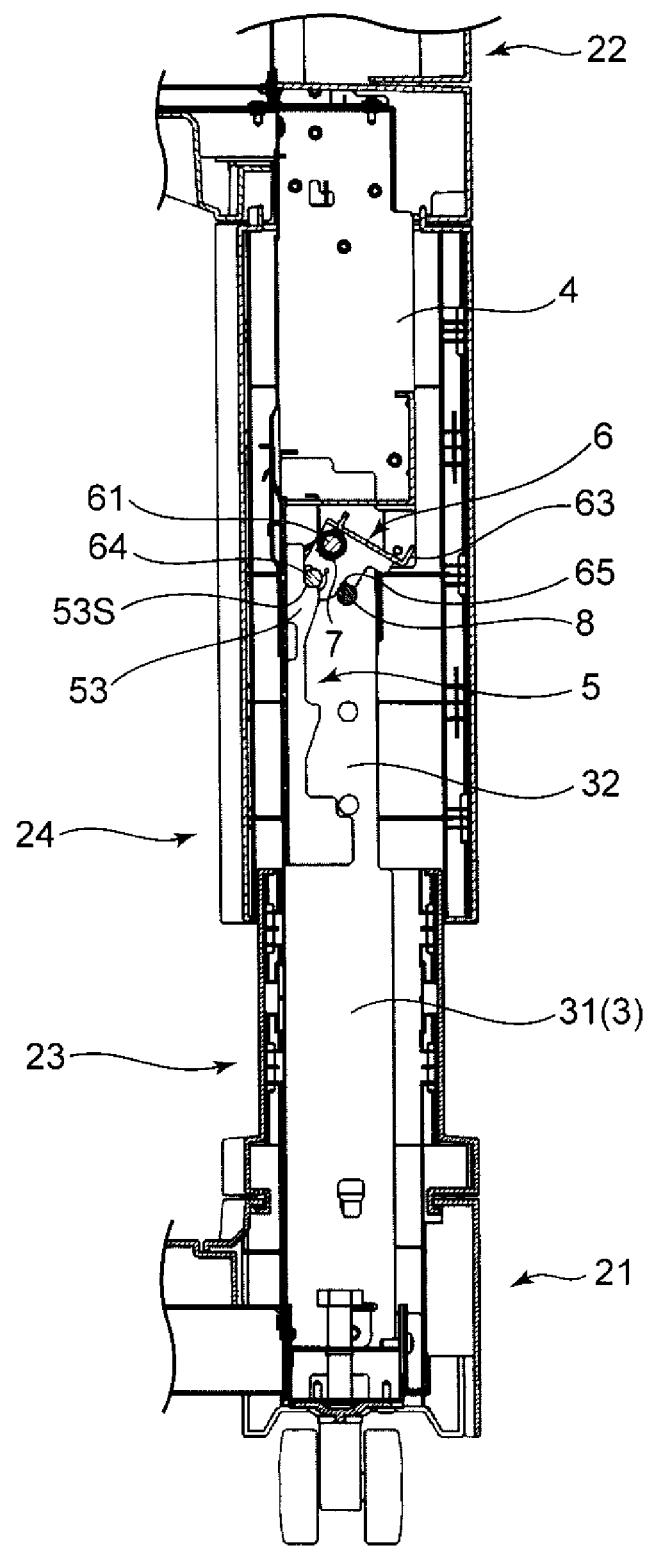
FIG. 13 is a side view schematically showing an engaging situation of the first frame and second frame, in a case where the sheet reception port of the housing is positioned at an upper position, according to the embodiment of the present disclosure.

FIG. 13 is a side view showing an engaging situation of the first frame 3 and second frame 4 in a case where the sheet reception port 25 is positioned at an upper position. A procedure of an ascent from the intermediate position to the upper position is the same as the procedure explained above with reference to the FIGS. 9-12. In the situation of FIG. 13, the supported bar 64 is supported by the third support upper face 53S1 and stopped into contact with the third contact face 53V by the bias force of the twist coil spring 7. The pin member is inserted in the third pin hole 323 of the first projection part 32 and fifth pin hole 421 of the second projection part 42 and supports the first reception part 65.

FIG. 14 is a side view showing an engaging situation of the first frame 3 and second frame 4 in a case where the sheet reception port 25 of the housing 22 is positioned at an uppermost position by turning the lever member 6 in the first turning direction R1 from the situation of FIG. 13. In the situation of FIG. 14, the supported bar 64 is supported by the sub support upper face 53S2 and stopped into contact with the bottom board 3B of the first frame 3 by the bias force of the twist coil spring 7. The pin member 8 is inserted in the fourth pin hole 324 of the first projection part 32 and fifth pin hole 421 of the second projection part 42 and supports the second reception part 66.

Therefore, by putting the lever member 6 in the interference posture and inserting the pin member 8 in the pin hole 321, 322, 323 or 324 to support the first reception part 65 or the second reception part 66, it is possible to fix the lever member 6 at a position corresponding to the support upper face 51S, 52S or 53S1 or the sub support upper face 53S2.

The sub support upper face 53S2 is a support upper face being at the height position close to the third support upper face 53S1 of the third engaged stop projection 53. In such a case of needing to arrange the support upper faces at the positions close to each other in the upward and downward directions, if, as illustrated by the first to third engaged stop projections 51 to 53, the horizontal engaged stop projections are arranged in the restriction board 50 and their upper edges is used as the support upper face, mechanical strength of the support upper face may be insufficiently secured. That is, the first support upper face 51S at the lowest position is formed in the upper edge of the first engaged stop projection 51 securable a comparative large area because it is unnecessary to consider avoidance of the interference with the supported bar 64, as a result, it is easy to secure sufficient mechanical strength for the load of the housing 22 applied via the supported bar 64. Moreover, the second and third support upper faces 52S and 53S1 have sufficient intervals from respective below support upper faces, and therefore, can be provided with the respective inclined parts 52L and 53L functioning as a reinforcement rib, as a result, it is easy to secure the mechanical strength. By contrast, even when intending to arrange an engaged stop projection corresponding to a height position of the sub support upper face 53S2, because an interval between the sub support upper face 53S2 and third support upper face 53S1 is short, it is not possible to arrange an inclined part securable the insufficient mechanical strength.

In the embodiment, the sub support upper face 53S2 is arranged, in the uppermost edge of the restriction board 50, at the position shifted in a direction approaching the third support upper face 53S1 not only in the upward and downward directions, but also in the horizontal direction. According to this, because the sub support upper face 53S2 is supported by the restriction board 50 over the entire length in the upward and downward directions, it is possible to secure the insufficient mechanical strength. The supported bar 64 is supported by either of the third support upper face 53S1 and sub support upper face 53S2 in accordance with a degree of turning the lever member 6 in the first turning direction R1 when changing a position of the sheet reception port 25 between the upper position (FIG. 13) and the uppermost position (FIG. 14).

In order to ascend the sheet reception port 25 from the upper position to the uppermost position, the user pulls out the pin member 8 from the situation of FIG. 13 to put the lever member 6 in a turnable state in the first turning direction R1. In such an ascending work, it is unnecessary to turn the lever 6 in the second turning direction R2. After that, the user lifts the housing 22 to ascend it to the uppermost position. When the supported bar 64 passes through the third contact face 53V, the lever member 6 is further turned in the first turning direction R1 by the bias force of the twist coil spring 7 and the supported bar 64 is put in a state placed on the sub support upper face 53S2. Moreover, by the turn in the first turning direction R1, the fourth pin hole 324 and depression of the second reception part 66 are put in an aligned state. Subsequently, the user inserts the pin member 8 in the fourth pin hole 324 of the first projection part 32 and fifth pin hole 421 of the second projection part 42 to lock the lever member 6.

By applying such a configuration, it is possible to adjust the slight height position of the sheet reception port 25 in accordance with the degree of turning the lever member 6 in the first turning direction R1. Because the positions of the third support upper face 53S1 and sub support upper face 53S2 are shifted not only in the upward and downward directions, but also in the horizontal direction, even if the height adjustment member 5 is formed by a simple board member as the embodiment, it is possible to secure the insufficient mechanical strength of the sub support upper face 53S2.

Figure 15:
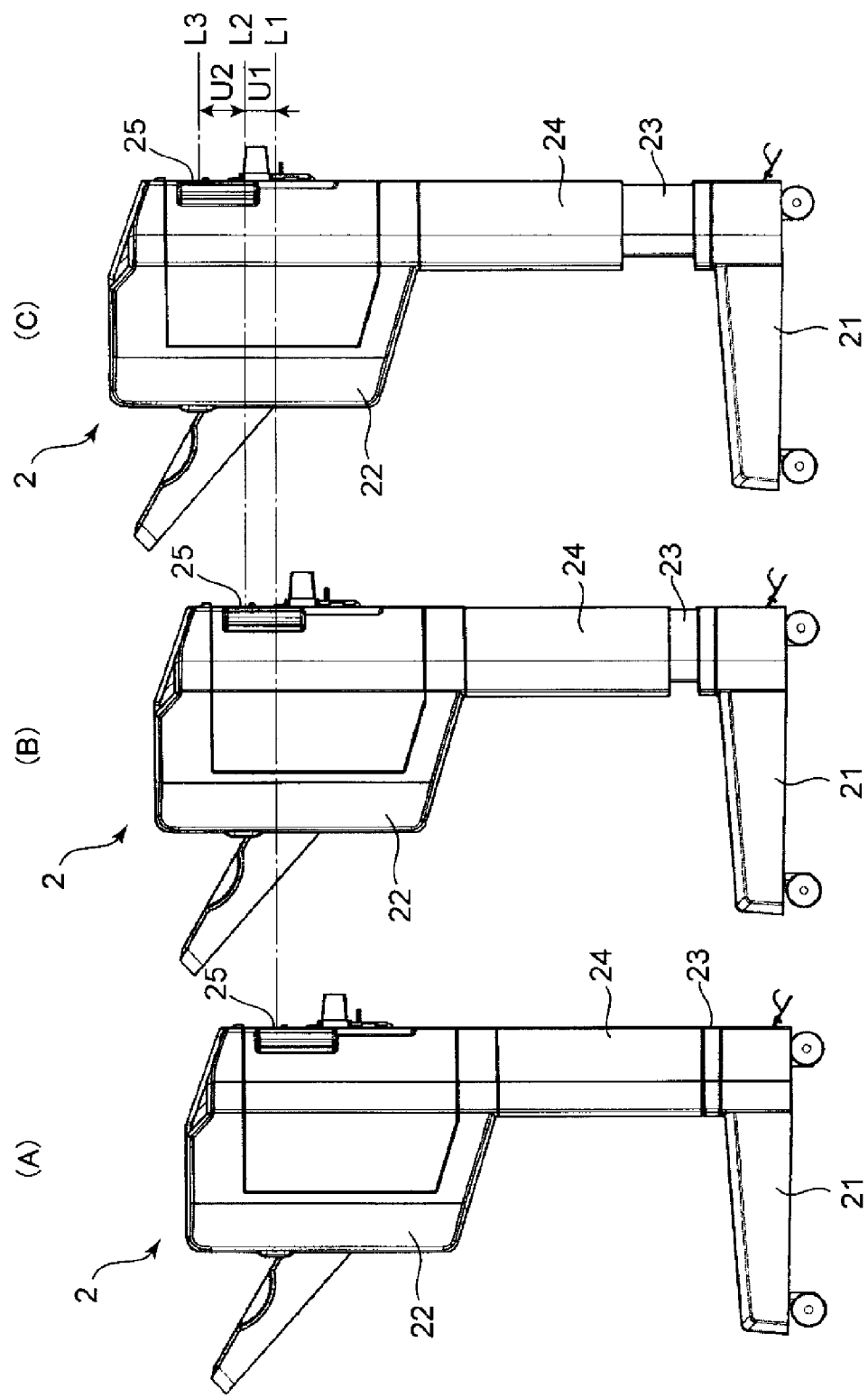
FIG. 15 is a side view schematically showing ascendant transition of the sheet reception port of the housing according to the embodiment of the present disclosure.

FIG. 15 is a side view showing ascendant transition of the sheet reception port 25 of the housing 22. FIG. 15 shows situations (A), (B) and (C) of the post-processing apparatus 2. In the situation (A), the sheet reception port 25 of the housing 22 is positioned at the lowest position L1 corresponding to the situation of FIG. 8. In the situation (B), the sheet reception port 25 is ascended from the lowest position L1 by a distance U1 and positioned at the intermediate position L2 corresponding to the situation of FIG. 12. In the situation (C), the sheet reception port 25 is ascended from the intermediate position L2 by a distance U2 and positioned at the upper position L3 corresponding to the situation of FIG. 13. The distances U1 and U2 are correspondent to a distance between the first support upper face 51S and second support upper face 52S and a distance between the second support upper face 52S and third support upper face 53S1. In a state of the uppermost position (not shown in FIG. 15) corresponding to the situation of FIG. 14, the sheet reception port 25 is positioned at a position slightly ascended from the situation (C) shown in FIG. 15.

As described above, in accordance with the post-processing apparatus 2 of the embodiment, by putting the lever member 6 in the interference posture and supporting the supported bar 64 of the lever member 6 with one of the first, second and third support upper faces 51S, 52S and 53S1 and the sub support upper face 53S2 of the height adjustment member 5, it is possible to hold the housing 22 at a predetermined height position. In addition, by putting the lever member 6 in the withdrawal posture once, moving the second frame 4 from the first frame 3 in the upward and downward directions, and then, returning it in the interference posture to support the supported bar 64 with another of the plurality of support upper faces, it is possible to change the height position of the housing 22. Therefore, by arranging the desired number of the support upper faces at desired height positions in the height adjustment member 5, it is possible to easily and securely set the sheet reception port 25 at the desired position. As a result, it is possible to provide the post-processing apparatus 2 applicable to a plurality of the image forming apparatuses having different height positions of the sheet ejection ports 16.

In accordance with the post-processing apparatus 2 of the embodiment, because the lever member 6 is arranged at the side of the second frame 4 unified with the housing 22, the user can easily height adjustment operation manipulating the lever member 6 and moving the housing 22 in the upward and downward directions.

As above, although the embodiment of the present disclosure was described in detail, the disclosure is not restricted to this. The disclosure may apply, for example, modified embodiments as follows.

The above-described embodiment illustrates an example of applying the sheet delivering device of the present disclosure to the post-processing apparatus 2 of the image forming system 100. Applied subjects of the sheet delivering device of the disclosure are not restricted to this. For example, the sheet delivering device may be applied to an external sheet feeding unit supplying the sheet to the image forming apparatus 1. In such a case, it is possible to utilize the sheet feeding unit so as to align a sheet ejecting port of the sheet feeding unit with each of sheet reception ports having different height positions in a plurality of the image forming apparatuses. Moreover, the disclosure can be applied to another sheet delivering device configured to transmit/receive the sheet to/from an external device in fields of various apparatuses except for the image forming apparatus.

Figure 16:
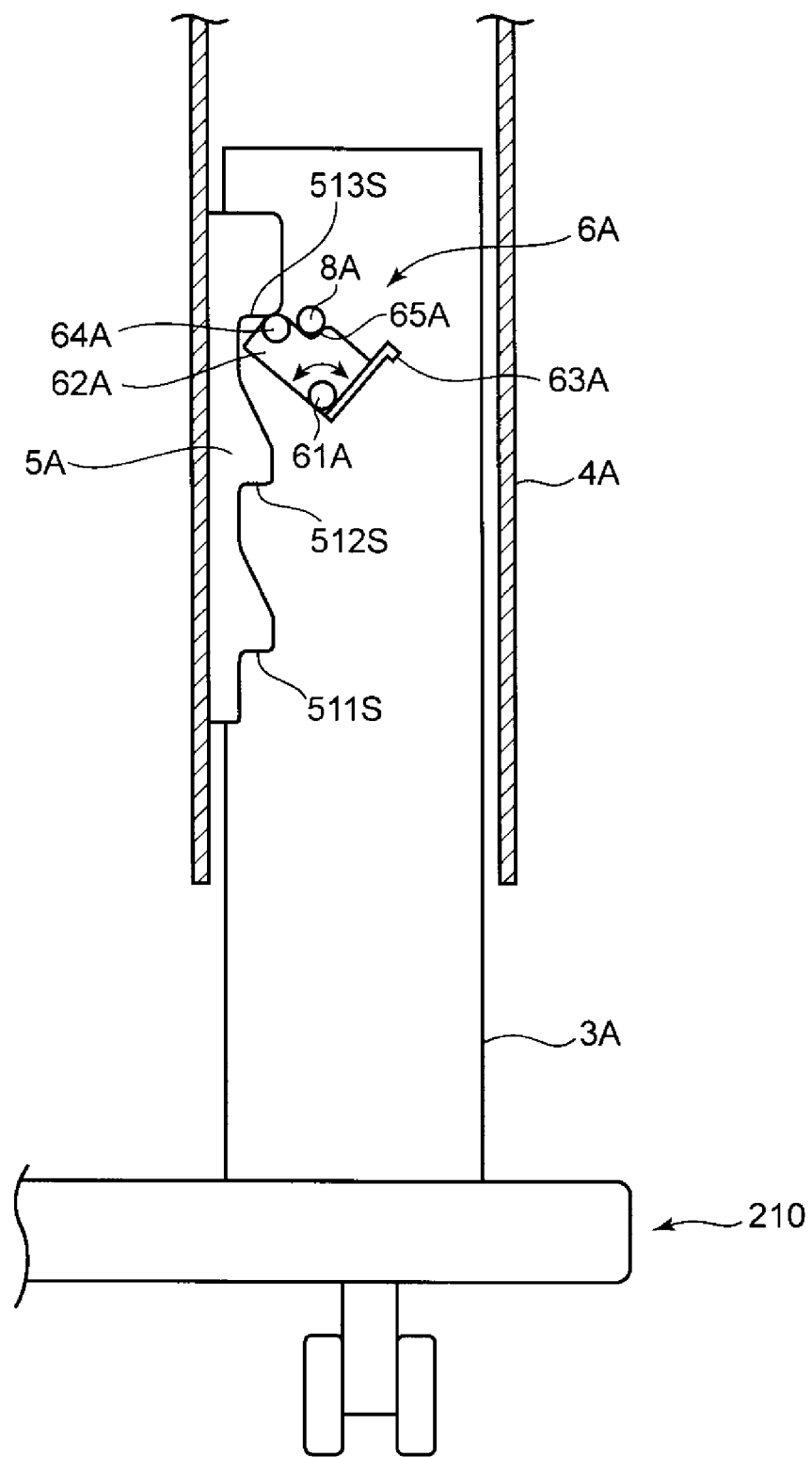
FIG. 16 is a schematic view showing a modified embodiment of the present disclosure.

Although the above-described embodiment illustrates an example of attaching the height adjustment member 5 to the first frame 3 and attaching the lever member 6 to the second frame 4, in a modified embodiment, these components may be inversely attached. FIG. 16 is a schematic view showing the modified embodiment of the present disclosure. In the modified embodiment, a lever member 6A is attached to a first frame 3 stood from a base 210 and a height adjustment member 5A is attached to a second frame 4A unified with the housing 22. The height adjustment member 5A includes three supported lower faces 511S, 512S and 513S from the lower side to the upper side. The lever member 6A includes an axis member 61A, holding members 62A, a manipulated part 63A, a support bar 64A and a reception part 65A and is biased by a twist coil spring (not shown) so as to turn around an axis of the axis member 61A in the counterclockwise direction.

The support bar 64A is stopped into contact with the supported lower face 513S. At a position of the reception part 65A, a pin member 8A supports and fixes the lever member 6A. When changing a height position, the user removes the pin member 8A and manipulates the manipulated part 63A to turn the lever member 6A in the clockwise direction and to put it in the withdrawal posture, and then, descends the second frame 4A. After that, the user releases the manipulated part 63A, makes the support bar 64A stopped into contact with the supported lower face 511S or 512S and inserts the pin member 8A in a predetermined pin hole.

The above-described embodiment illustrates an example of arranging the first frames 3 (the base leg parts 23) and second frames 4 (the housing leg parts 24) as a pair at the front and rear of the post-processing apparatus 2. Instead of this, one first frame 3 and one second frame 4 may be arranged at a center part in the forward and backward directions.

The above-described embodiment illustrates the twist coil spring 7 generating the bias force as an example of the auxiliary member giving the lever member 6 a moving force toward the first turning direction. Although this is one example, a weight or the like acting to turn the lever member 6 in the first turning direction may be applied as the auxiliary member.

While the present disclosure has been described with reference to the preferable embodiment of the sheet delivering device of the disclosure and the description has technical preferable illustration, the disclosure is not to be restricted by the embodiment and illustration. Components in the embodiment of the present disclosure may be suitably changed or modified, or variously combined with other components. The claims are not restricted by the description of the embodiment.

What is claimed is:
1. A sheet delivering device comprising:
a base;
a first frame being stood on the base and extending in upward and downward directions;
a housing including a sheet distribution opening as an inlet and an outlet of a sheet and having a height position adjusted to the base;
a second frame being attached to the housing in a body, extending in the upward and downward directions and being located adjacent to the first frame;
a height adjustment member being attached to one of the first frame and second frame and including a plurality of engaged stop parts arranged at different height positions;
a lever member being turnably attached to another of the first frame and second frame and including a contact stop member stopped into contact with the engaged stop part of the height adjustment member, wherein a posture of the lever member is changed between an interference posture forming a contact stopping state by interfering the contact stop member with the engaged stop part and a withdrawal posture making the contact stop member withdrawn from the engaged stop part without interfering the contact stop member with the engaged stop part when the housing moves to the base in the upward and downward directions, the lever member usually is advanced to the interference posture by a movement force in a first turning direction, and the posture of the lever member is changed from the interference posture to the withdrawal posture by a turn of the lever member in a second turning direction opposite to the first turning direction against the movement force; and an auxiliary member giving the lever member the movement force toward the first turning direction, wherein the height adjustment member is attached to the first frame and the lever member is attached to the second frame, the engaged stop part is composed of an engaged stop projection having a support upper face, and the contact stop member is a supported member by the support upper face of the engaged stop projection.

2. The sheet delivering device according to claim 1, wherein the height adjustment member further includes a sub support upper face located near the support upper face of the engaged stop projection and at a position shifted from the support upper face in the upward and downward directions and in left and right directions, and the supported member is supported by either of the support upper face and sub support upper face in accordance with a degree of turning the lever member in the first turning direction.

3. The sheet delivering device according to claim 1 further comprising a pin member fixing the lever member being in a state of the interference posture, wherein the first frame includes a first pin hole and a second pin hole respectively corresponding to positions of the support upper face and sub support upper face in which the pin member is inserted, and the lever member includes an axis member being as an axis of turning the lever member;

a holding member configured to turn around the axis of the axis member;

a manipulated part formed with the holding member in a body so as to be manipulated when the lever member is turned in the second turning direction;

a supported bar being as the supported member held by the holding member;

a first reception part formed in the holding member and supported by the pin member inserted in the first pin hole in a state that the lever member is in the interference posture to the support upper face; and a second reception part formed in the holding member and supported by the pin member inserted in the second pin hole in a state that the lever member is in the interference posture to the sub support upper face.

4. The sheet delivering device according to claim 3, wherein the first reception part and second reception part of the lever member are supported by the pin member inserted in both the first pin hole and second pin hole arranged in the first frame and another pin hole arranged in the second frame.

5. The sheet delivering device according to claim 1 further comprising a fixing member fixing the lever member being in a state of the interference posture.

6. The sheet delivering device according to claim 1 further comprising a pin member fixing the lever member being in a state of the interference posture, wherein the first frame includes a pin hole corresponding to a position of the support upper face in which the pin member is inserted, and the lever member includes an axis member being as an axis of turning the lever member;

a holding member configured to turn around the axis of the axis member;

a manipulated part formed with the holding member in a body so as to be manipulated when the lever member is turned in the second turning direction;

a supported bar being as the supported member held by the holding member; and a reception part formed in the holding member and supported by the pin member inserted in the pin hole in a state that the lever member is in the interference posture.

7. The sheet delivering device according to claim 6, wherein the reception part of the lever member is supported by the pin member inserted in both the pin hole arranged in the first frame and another pin hole arranged in the second frame.

8. The sheet delivering device according to claim 1, wherein the auxiliary member is a coil spring having a biasing force as the movement force usually biasing the lever member so as to turning in the first turning direction.

9. The sheet delivering device according to claim 1, wherein the sheet delivering device is a post-processing apparatus appended to an image forming apparatus carrying out an image forming process to the sheet and configured to carry out a predetermined post-process to the sheet having an image formed, and the housing is configured to house a post-process unit carrying out the post-process and the sheet distribution opening is a reception port receiving the sheet from the image forming apparatus.

* * * * *